United States Patent
Witt et al.

(10) Patent No.: US 12,489,326 B2
(45) Date of Patent: Dec. 2, 2025

(54) STATOR FOR AXIAL FLUX MOTOR HAVING INTERLOCKING AND FRICTIONAL CONNECTION AND AXIAL FLUX MOTOR IN I-ARRANGEMENT AND DIRECT LINE COOLING

(71) Applicant: Schaeffler Technologies AG & Co. KG, Herzogenaurach (DE)

(72) Inventors: Holger Witt, Bühl (DE); Michael Menhart, Igling (DE); Stefan Riess, Kaufering (DE); Johann Oswald, Eschenlohe (DE); Carsten Sonntag, Gauting-Königswiesen (DE); Andrä Carotta, München-Hadern (DE); Daniel Mahler, Hofstetten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 264 days.

(21) Appl. No.: 18/030,538

(22) PCT Filed: Sep. 30, 2021

(86) PCT No.: PCT/DE2021/100787
§ 371 (c)(1),
(2) Date: Apr. 6, 2023

(87) PCT Pub. No.: WO2022/073549
PCT Pub. Date: Apr. 14, 2022

(65) Prior Publication Data
US 2023/0369925 A1 Nov. 16, 2023

(30) Foreign Application Priority Data

Oct. 7, 2020 (DE) .................... 10 2020 126 280.9
Apr. 10, 2021 (DE) .................... 10 2021 108 956.5

(51) Int. Cl.
*H02K 1/20* (2006.01)
*H02K 1/18* (2006.01)

(52) U.S. Cl.
CPC ................. *H02K 1/20* (2013.01); *H02K 1/18* (2013.01)

(58) Field of Classification Search
CPC ............................... H02K 1/18; H02K 1/182; H02K 1/20; H02K 1/2793; H02K 1/2796; H02K 21/026; H02K 9/00; H02K 9/20
(Continued)

(56) References Cited

FOREIGN PATENT DOCUMENTS

CN 205693458 11/2016
CN 205693458 U * 11/2016
(Continued)

OTHER PUBLICATIONS

Machine Translation of CN_205693458_U (Year: 2016).*
Machine Translation of JP_2010154610_A (Year: 2010).*
Machine Translation of JPS5668236A (Year: 1981).*

*Primary Examiner* — Alexander A Singh
*Assistant Examiner* — Charlie Frank Mann, Jr.
(74) *Attorney, Agent, or Firm* — Volpe Koenig

(57) ABSTRACT

A stator for an axial flux motor having a laminated stator core which is fastened to a flange, wherein the laminated stator core has a rear side which is interlockingly and frictionally fastened to a front side of the flange, and/or a cooling channel between the laminated stator core and the flange is formed in the region of the fastening. An axial flux motor is also provided having a rotor which is arranged between two stators, of which one or both are as described above.

19 Claims, 4 Drawing Sheets

(58) Field of Classification Search
USPC ...... 310/52, 54, 55, 57, 58, 59, 60 A, 64, 42
See application file for complete search history.

(56) References Cited

FOREIGN PATENT DOCUMENTS

| | | | |
|---|---|---|---|
| CN | 211127334 | | 7/2020 |
| EP | 3738199 | | 8/2021 |
| JP | S5668236 A | * | 6/1961 |
| JP | S5668236 | | 6/1981 |
| JP | 2010154610 | | 7/2010 |
| JP | 2010154610 A | * | 7/2010 |
| WO | 0111755 | | 2/2001 |
| WO | 2010092403 | | 8/2010 |
| WO | 2019138308 | | 7/2018 |

* cited by examiner

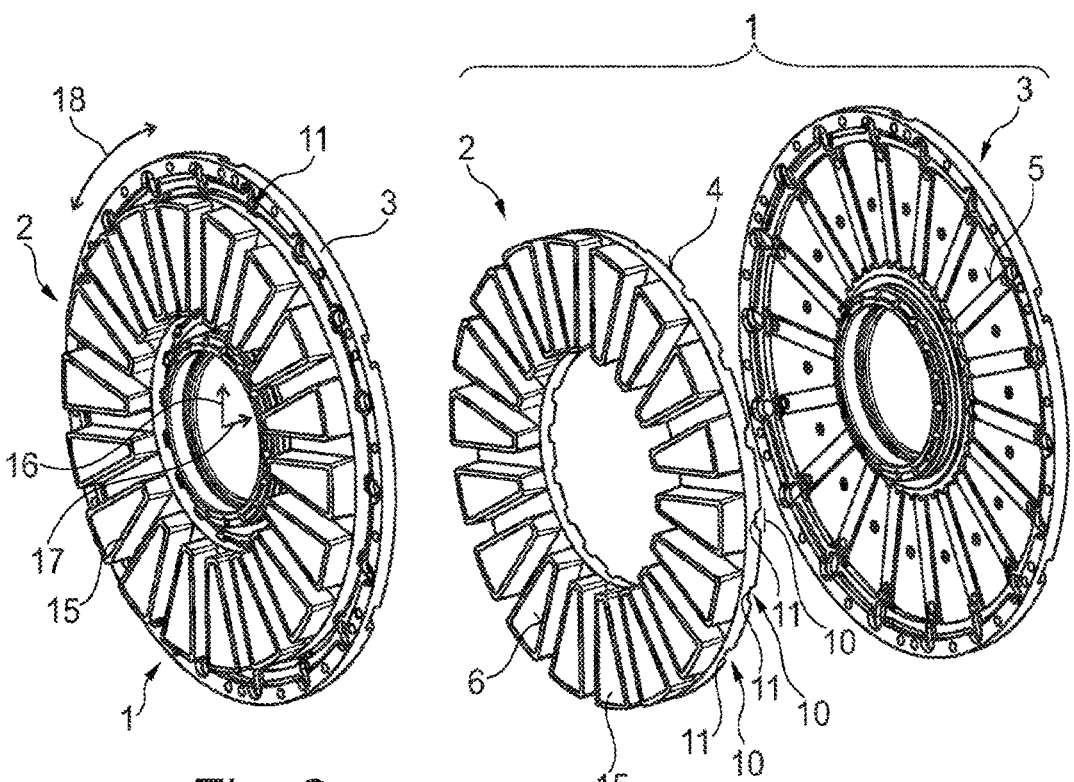
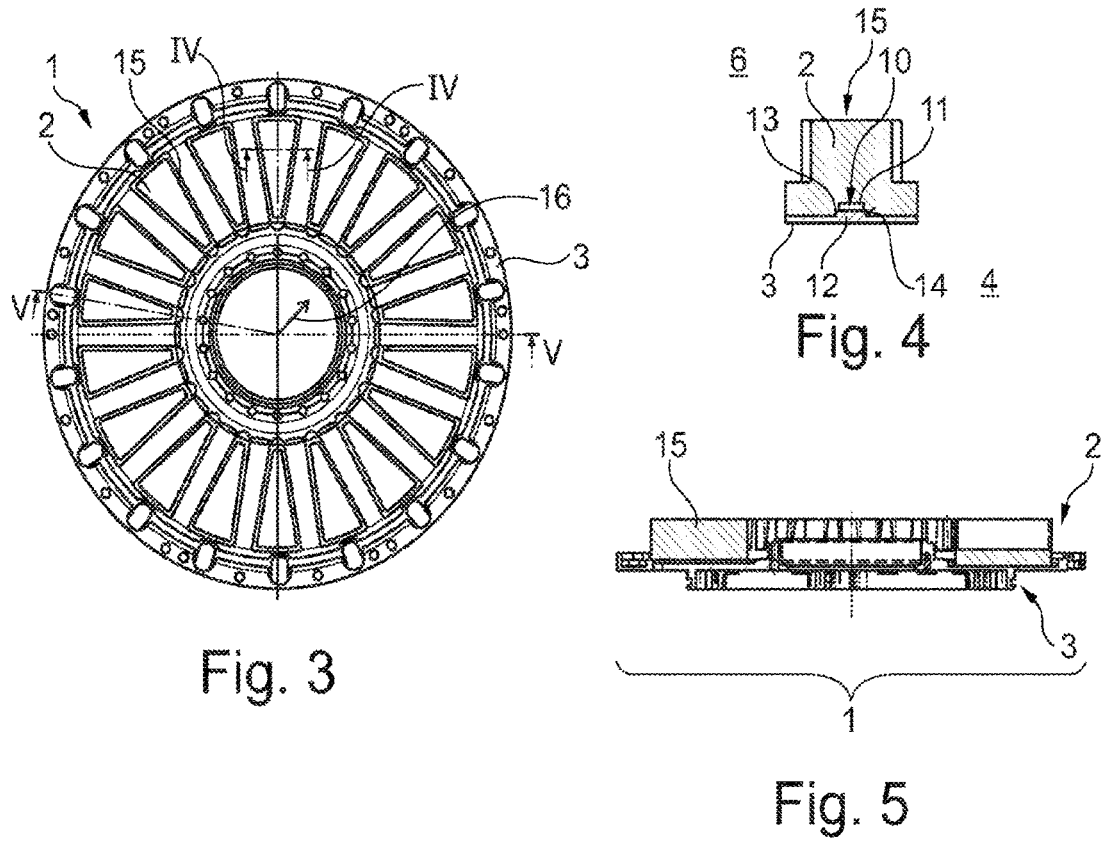

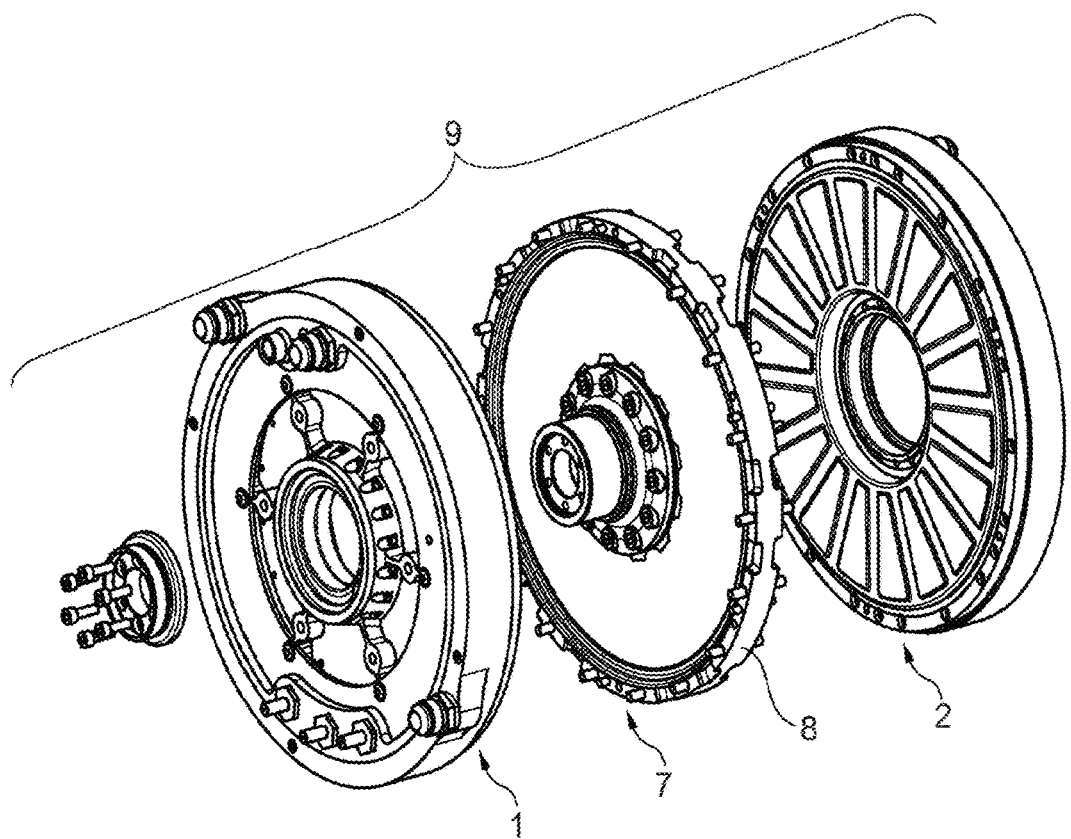
Fig. 6
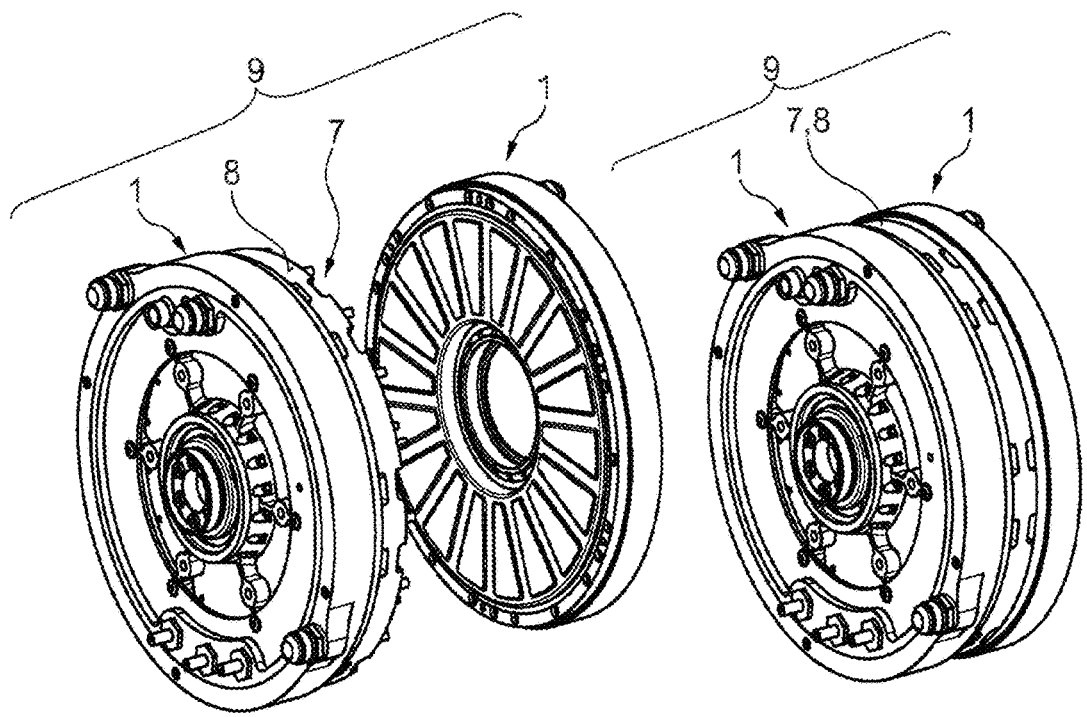
Fig. 7
Fig. 8

STATOR FOR AXIAL FLUX MOTOR HAVING INTERLOCKING AND FRICTIONAL CONNECTION AND AXIAL FLUX MOTOR IN I-ARRANGEMENT AND DIRECT LINE COOLING

CROSS-REFERENCE TO RELATED APPLICATIONS

This application is the U.S. National Phase of PCT Appln. No. PCT/DE2021/100787, filed Sep. 30, 2021, which claims the benefit of German Patent Appln. No. 102020126280.9, filed Oct. 7, 2020, and German Patent Appln. No. 102021108956.5, filed Apr. 10, 2021, the entire disclosures of which are incorporated by reference herein.

TECHNICAL FIELD

The disclosure relates to a stator for an axial flux motor, which can also be referred to as an axial flux machine, for example in an I arrangement and with high power density for use in a traction drive, with a preferably stamped and/or wound laminated stator core which is fastened to a flange.

BACKGROUND

Electric axial flux machines are known from the prior art, for example from WO 01/11755 A1. Disclosed therein is an electric axial flux machine comprising an ironless disk-shaped rotor arranged on a machine shaft and two stators arranged adjacent to the rotor. The rotor features permanent magnets embedded in a fiber- or fabric-reinforced plastic. The permanent magnets are each connected to the surrounding plastic in an interlocking manner. Together with the permanent magnet and the machine shaft, the plastic forms a dimensionally stable unit.

An electromagnetic motor or generator with two rotors, four stators and an integrated cooling system is also known, for example from EP 3 738 199 A1.

Furthermore, an electric machine is also known from WO 2010/092403 A2, in which cooling with a coolant flow in the circumferential direction appears to be disclosed.

An electric drive train is also known in principle from the prior art. Such an electric drive train consists of components for energy storage, energy conversion and energy transmission. The components for energy conversion include electric machines, e.g. axial flux machines. Axial flux machines are, as already explained, also known in principle from the prior art in various designs with one or more stators and one or more rotors. Axial flux machines can be operated as axial flux motors.

In known axial/radial flux machines, stators are connected to the surrounding supporting structure in various ways. These can be, among other things, a radial shrink-fitting/press-fitting into a housing, axial screw-tightening by means of the screws on a housing and/or bearing flanges or other solutions. Geometries can also be provided on the lamination of the stator which are intended exclusively for fastening the latter and do not affect the electromagnetically relevant region.

In the case of axial flux machines in I-designs, a superimposed force component acting in the axial direction is added to the torque transmission due to the motor torque, which also has to be transferred to the surrounding supporting structure.

In axial flux machines, here in particular in I-arrangements with one or two stators and a coaxially arranged or intermediate rotor, the geometry of the stator is usually reduced to the electromagnetic function. No additional geometry elements are provided here on the stator for fastening it. However, stators are adhesively bonded on the yoke side in a planar manner or screwed instead, namely from both the yoke side as well as the pole side. Screw connections of this type result in additional losses or reduced machine performance. Shrinkage of the laminated core is hardly possible due to its low inherent stability, in particular at higher power/torque.

SUMMARY

It is the object of the present disclosure to eliminate or at least mitigate the disadvantages present in the prior art.

This object is achieved with one or more of the features disclosed.

More precisely, this object is achieved for a generic stator according to the disclosure in that the laminated stator core has a rear side/pole side which is interlockingly and frictionally fastened to a front side of the flange and/or a cooling channel (extending in the radial direction) between the laminated stator core and the flange is formed in the region of the fastening.

Even at high power or torque, it is now possible to safely and permanently dissipate/transfer the occurring forces into the housing/flange. No additional installation space is required and additional parts/components are kept to a minimum.

In other words, the solution to the problem is to implement a combination of an interlocking and frictional connection between the laminated stator core and the housing/flange located on its yoke side. For this purpose, radial grooves are introduced on the yoke side of the laminated stator core. Ideally, these have the same number and tangential (angular) position as pole centers (number of winding grooves) on the opposite pole side. There is relatively little electromagnetic activity on this pole side and this therefore has an insignificant effect on the performance of the drive. In addition, these grooves can be produced as part of the manufacturing process of the stator (punching and winding at the same time). No further process is necessary.

On the corresponding surface of the housing/flange, corresponding ridges/ribs are provided which stiffen this component and engage in the grooves described above on the yoke side of the laminated stator core. The moment/torque of the drive can be transferred via this interlocking engagement. This also defines the tangential and centric position of the laminated stator core. The fastening and the transmission of the axial forces are achieved by adhesively bonding the stator yoke to the housing in a planar manner. This distribution of the occurring forces can significantly reduce the load on the adhesive connection.

The planar adhesive connection acoustically decouples the laminated stator core and the housing, resulting in a reduction in motor noise.

A special design of the groove in the laminated stator core can be achieved by providing a stepped design. Due to the stepped design of the groove in the laminated stator core, a channel is formed which runs on the yoke side from the inner diameter of the laminated core to the outer diameter of the laminated core. In the present design, this serves as a return channel for the cooling medium used, such as oil, and cools the stator at the same time.

The steps of the groove are selected such that they determine the axial position of the laminated stator core on the pole side (air gap to the rotor) and also set the adhesive gap in a controlled manner.

When mounting the laminated core, it only needs to be mounted up to a stop in the housing/against the flange and held until the adhesive connection is activated. Ultimately, the disclosure also relates to such a method, namely an assembly method, as well as a cooling method.

Advantageous embodiments are explained in more detail below and in the claims.

Thus, it is advantageous if the flange is formed as a housing or housing component. This facilitates embedding in a traction drive.

It is considered expedient if on the rear side grooves/indentations/recesses are present, which are in interlocking engagement with (partially/completely) opposite ridges/elevations/ribs. The rear side/pole side of the laminated stator core is thus prepared in a skillful manner to enter into an interlocking engagement with the front side of the flange/housing that is as rectangular as possible. This results in a good force transmission.

It has also proved useful if the grooves/indentations/recesses extend in their longitudinal extension in the radial direction and/or the ridges/elevations/ribs extend in their longitudinal extension in the radial direction. It is advantageous if the same separation is maintained for both the grooves and the ridges. This means that the same angular subdivision is used.

An advantageous embodiment is also characterized in that one (preferably each) groove/indentation/recess in turn has a channel/trough covered by the ridge/elevation/rib, but which is unfilled to allow for a cooling and hydraulic fluid line. The dissipation of energy, either from the center or to the center, namely thermal energy, is thus facilitated.

In addition, it has proven useful if some or all grooves are designed to be stepped, preferably symmetrically on both sides along the longitudinal axis of the respective groove. On the one hand, this maintains the interlocking engagement in a skillful manner and, on the other hand, ensures that a cooling possibility is guaranteed.

In addition, it has proven useful if the groove has a wall facing an inner side of the groove which acts as a stop for a counter stop provided by the ridge.

An advantageous embodiment is also characterized in that an adhesive gap present between the rear side of the laminated stator core and the front side of the flange is filled (completely/partially/in a planar manner) with adhesive.

If the front side of the ridge facing the laminated stator core is covered (completely or partially or not at all) by an adhesive film, the adhesion of the laminated stator core to the flange is increased.

The disclosure also relates to an axial flux motor in an I arrangement with a rotor arranged coaxially to a stator, which is formed according to the stator disclosed herein. Furthermore, two stators can be provided, between which the rotor is located and which are designed according to the stator disclosed herein.

Furthermore, the disclosure relates in particular to an indirect cooling of conductors by cooling the rear side of the stator.

Further concerned is a direct cooling of the conductors, wherein the coolant is directed around the machine in the circumferential direction and in individual winding grooves or grouped winding grooves the coolant flows from radially outside to radially inside in an alternating manner and, in the case of the adjacent winding grooves, the coolant flows from radially inside to radially outside.

In particular, the object of integrating a direct conductor cooling for an axial flux machine in an I arrangement with distributed winding/shaft winding is achieved.

Advantageously, goals for the axial flux machine, such as sustaining a high power density and providing high efficiency, are achieved. A high power density places special demands on the cooling concept. This is now being taken into account.

An outer distribution channel enclosing the outer winding heads and an inner distribution channel enclosing the inner winding heads are formed.

Cavities are located parallel to the conductors in the winding grooves which form a connection for the coolant from the outer distribution channel to the inner distribution channel. These cavities can be formed, for example, by the winding grooves having a rectangular cross-section in which several round conductors are guided.

In the case of the inner distribution channel, the seal to the rear side of the stator (side facing away from the air gap to the rotor) has openings/penetrations which allow coolant flow to the rear side of the stator. The stator has grooves on the rear side which form a connection for the coolant radially to the outside.

The flow direction of the coolant is not fixed by the above wording.

The following is a description of a possible implementation.

In fact, typical of the I arrangement is a center disk-like rotor, which has a right and a left stator (with a right and a left stator core) each to the side of the rotor. Each stator has a winding with an outer and an inner winding head. Parts of the conductors of the windings extend in the winding grooves between the outer and inner winding head and generate an electromagnetic force on the rotor when current is applied.

The outer winding head is located in a volume for the outer winding head, which is bordered radially to the inside by the stator core, radially to the outside by the motor housing, to the rotor by a separating wall to the rotor and to the stator rear side by an outer separating wall on the rear side.

The inner winding head is located in a volume for the inner winding head, which is bordered radially to the inside by a seal to the shaft, radially to the outside by the stator core, to the rotor by a separating wall to the rotor and to the stator rear side by a bearing support wall (wherein this wall does not necessarily have to support the bearing, but is only embodied this way here in this example).

The bearing support wall has penetrations that connect the volume for the inner winding head with the rear side of the stator.

The stator rear wall has grooves for the coolant return which connect the penetrations/openings in the bearing support wall to a "collector channel for the coolant return" located radially on the outside.

If required, further sealing elements are provided for the volumes for the winding heads, which can, for example, also be arranged in the volume for the winding heads, or only at the separating points of the individual components or also outside the volume for the winding heads.

The volume for the outer winding head, the clearances in the winding grooves parallel to the conductors in the grooves, the volume for the inner winding head, the openings for the coolant in the bearing support wall, the grooves for the coolant return on the stator rear side and the collector channel for the coolant return form a connected volume through which the coolant can flow or is pumped if required. The flow direction can be freely selected when designing the motor. For this purpose, the collector channel for the coolant return and the volume for the outer winding head are connected to the coolant supply by means of supply and return lines. The coolant return line is not shown in the figures below.

One can easily imagine the flow in the volume for the outer winding head from the supply line in the volume to one of the winding grooves (as visualized later in FIG. 11), just as one can imagine the flow in the winding groove (parallel to the conductors in the winding groove) to the volume for the inner winding head. This allows a flow from the inner winding head through the openings in the bearing support wall to the rear side of the stator and a flow radially to the outside through the grooves on the rear side of the stator. One can also easily imagine the winding grooves and the volume for the inner winding head (the winding head being hidden) with the openings in the bearing support wall, in particular upon closer look at FIGS. 9 to 13 described in more detail later.

As shown in FIG. 11, the grooves for the coolant return are offset in the circumferential direction relative to the winding grooves, so that the removal of material for the grooves for the coolant return does not affect the function of the magnetic flux line in the stator yoke, or only does so to a small extent.

This type of cooling can also be used, for example, with an axial flux machine in a half I arrangement (with only one stator on only one side of the rotor).

The axial flux machine could also be designed with a single tooth winding instead of a shaft winding (both have outer and inner winding heads and conductors extending in the winding grooves).

BRIEF DESCRIPTION OF THE DRAWINGS

The disclosure is also explained in more detail below with the aid of a drawing. In the drawings:

FIG. 1 shows a stator in an exploded view, comprising a laminated stator core and a housing/flange, FIG. 2 shows the stator configuration from FIG. 1, which is interlockingly and frictionally coupled, FIG. 3 shows a front view of the stator from FIG. 2, FIG. 4 shows a partially illustrated longitudinal sectional view along the line IV in FIG. 3, FIG. 5 shows a bent longitudinal sectional view along the line V in FIG. 3, FIG. 6 shows an exploded view of an axial flux motor according to the disclosure with two identical stators according to the type of stator in FIGS. 1 to 3, FIG. 7 shows the state of the axial flux motor from FIG. 6 during assembly, FIG. 8 shows the state of the axial flux motor of FIGS. 6 and 7 after assembly.

DETAILED DESCRIPTION

Figure 10:
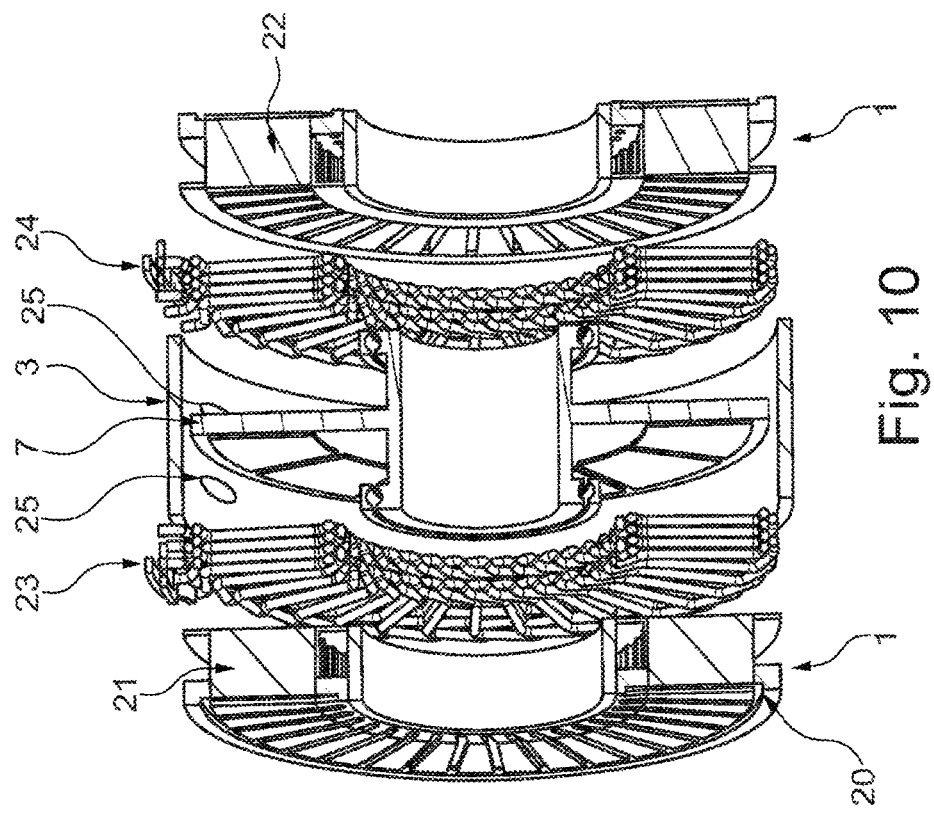
FIGS. 9 and 10 show a schematic representation of an axial flux motor with a shaft winding.

The figures are only schematic in nature and serve only for understanding of the disclosure. The same elements are provided with the same reference symbols. The features of the individual embodiments can be interchanged.

FIG. 1 shows a first embodiment of a stator 1 according to the disclosure. The stator 1 has a laminated stator core 2 and a flange 3. The laminated stator core 2 has a rear side/yoke side 4.

The flange has a front side 5 facing the rear side 4 of the laminated stator core 2. On the other side of the rear side 4 of the laminated stator core, the laminated stator core has a pole side 6. This pole side 6 could also be referred to as the front side of the laminated stator core.

A rotor 7 faces the pole side 6, as shown for example in FIGS. 6 to 8. A spacer ring 8 is also used in this regard. Two stators 1 on both sides of the rotor 7 with its spacer ring 8 form the axial flux motor/axial flux machine, which is indicated by the reference symbol 9, to an essential extent.

Returning to FIG. 1, it should be highlighted that grooves/indentations/recesses 10 are distributed regularly around the circumference and extend longitudinally in the radial direction from radially inside to radially outside. Each groove 10 in turn has a channel 11 open in the direction of the flange 3, resulting in a stepped design of the groove 10. This is particularly well illustrated in FIG. 4.

There it is also easy to see that a ridge/elevation/rib 12 of the flange 3, which follows the division of the grooves 10 in terms of angle and length, covers the channel 11 but does not fill it, only closes it, though it does (preferably) engage in an interlocking manner in the groove 10 and is dimensioned such that a stop 13 of the laminated stator core, formed by a wall of the groove 10, lies flush and thus in an interlocking manner in contact with a counter stop 14, formed by the ridge 12. The channel 11 serves as an oil channel.

A stator tooth is indicated by the reference symbol 15. It extends in the direction of the pole side 6. The flange 3 is present on the yoke side. The stops 13 and counter stops 14 act as axial stops or transmit torque when the laminated stator core 2 rotates relative to the flange 3.

The radial direction is indicated by arrow 16. The axial direction is referenced by arrow 17, see for example FIG. 2. The circumferential direction is referenced there by the reference symbol/arrow 18.

Figure 9:
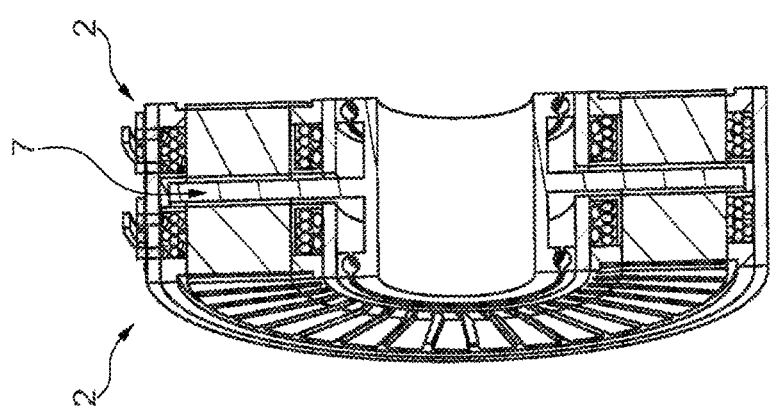

Whereas in FIG. 9 air gaps in particular are highlighted with the reference symbol 19, in FIG. 10 a collector channel 20 for coolant return, a left stator core 21 and a right stator core 22 as well as a left winding 23 and a right winding 24 as well as a flange 3 formed to the housing next to the rotor 7, having at least two coolant supply lines 25, can be seen particularly well.

Figure 11:
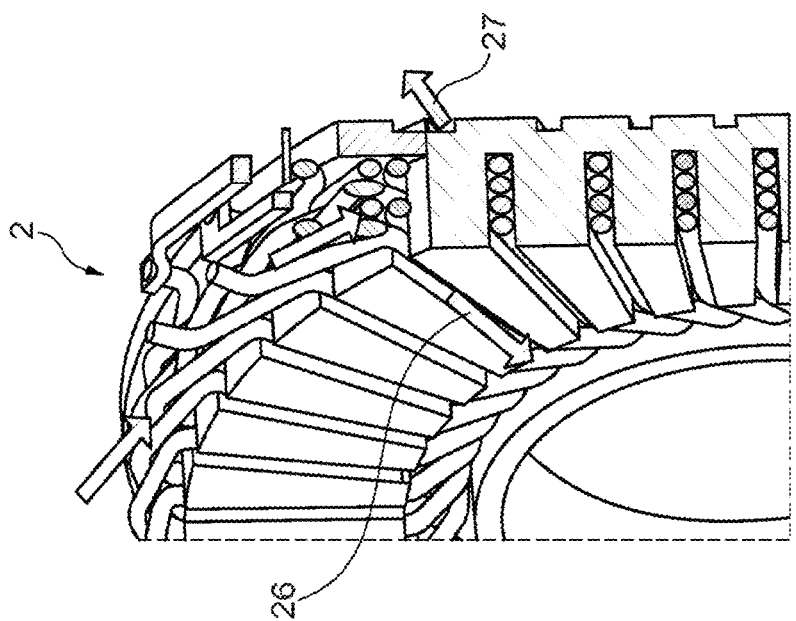
FIGS. 11 to 13 show a visualization of the coolant flow through the axial flux motor of FIGS. 9 to 10.
Figure 12:
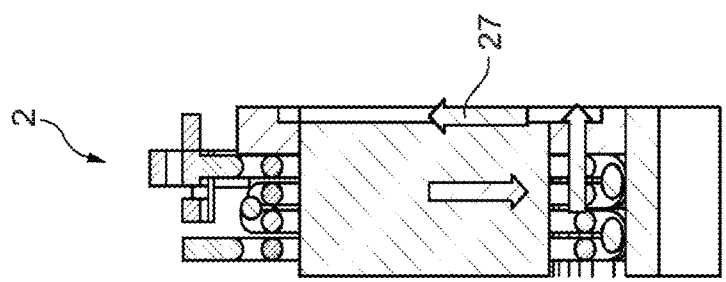
Figure 13:
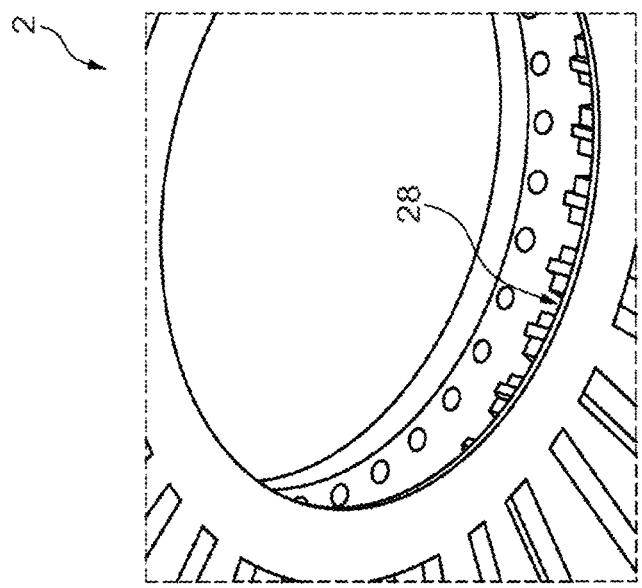

A coolant flow in the winding groove parallel to the wires, e.g. in the clearances between a round wire and a rectangular groove, is visualized with the arrow 26, see in particular FIG. 11. A coolant flow at a stator rear wall is referenced by reference symbol 27, particularly in FIGS. 11 and 12. Winding grooves are referenced by reference symbol 28 in FIG. 13.

LIST OF REFERENCE SYMBOLS

1 Stator
2 Laminated stator core
3 Flange
4 Rear side
5 Front side
6 Pole side
7 Rotor
8 Spacer ring
9 Axial flux motor/axial flux machine
10 Groove/indentation/recess
11 Channel 12 Ridge/elevation/rib
13 Stop
14 Counter stop
15 Stator tooth
16 Radial direction
17 Axial direction
18 Circumferential direction
19 Air gap
20 Collector channel
21 Left stator core
22 Right stator core
23 Left winding
24 Right winding
25 Coolant supply line
26 Coolant flow
27 Coolant flow
28 Winding groove

The invention claimed is:

1. A stator for an axial flux motor, the stator comprising:
a laminated stator core fastened to a flange, the laminated stator core has a rear side which is interlockingly and frictionally fastened to a front side of the flange; and
a plurality of cooling channels between the laminated stator core and the flange are formed in a region of the fastening of the rear side of the laminated stator core to the front side of the flange;
wherein a plurality of stator teeth are provided on a front side of the laminated stator core and each of the plurality of cooling channels are circumferentially aligned with one of the plurality of stator teeth.

2. The stator according to claim 1, wherein the flange is formed as a housing or housing component.

3. The stator according to claim 1, further comprising at least one of grooves, indentations, or recesses on the rear side of the laminated stator core that are in interlocking engagement with oppositely arranged at least one of ridges, elevations, or ribs of the flange.

4. The stator according to claim 3, wherein the at least one of grooves, indentations, or recesses extend in a longitudinal extension thereof in a radial direction.

5. The stator according to claim 3, wherein one or more of the at least one of the grooves, indentations, or recesses include a channel or trough covered in an unfilled manner by a respective one of the at least one of the ridges, elevations, or ribs to allow for a cooling and hydraulic fluid line.

6. The stator according to claim 3, wherein at least some of the at least one of the grooves, indentations, or recesses are stepped.

7. The stator according to claim 3, wherein one or more of the at least one of the grooves, indentations, or recesses has a wall facing an inner side thereof which acts as a stop for a counter stop provided by a corresponding one of the at least one of the ridges, elevations, or ribs.

8. The stator according to claim 3, wherein a front side of the at least one of the ridges, elevations, or ribs facing the laminated stator core is covered by an adhesive film.

9. The stator according to claim 3, wherein the at least one of the ridges, elevations, or ribs extend with a longitudinal extension thereof in a radial direction.

10. The stator according to claim 1, further comprising an adhesive gap between the rear side of the laminated stator core and the front side of the flange that is filled with adhesive.

11. An axial flux motor comprising a rotor arranged coaxially to at least one of the stators formed according to claim 1.

12. A stator for an axial flux motor, the stator comprising:
a laminated stator core fastened to a flange, the laminated stator core has a rear side which is interlockingly and frictionally fastened to a front side of the flange via at least one of a ridge, elevation, or rib on the front side of the flange engaging in a corresponding at least one of a recess, groove, or indentation on the rear side of the laminated stator core; and
a plurality of cooling channels between the laminated stator core and the flange is formed in a region of the fastening of the rear side of the laminated stator core to the front side of the flange;
wherein a front side of the at least one of the ridge, elevation, or ribs facing the laminated stator core is covered by an adhesive film; and
wherein a plurality of stator teeth are provided on a front side of the laminated stator core and each of the plurality of cooling channels are circumferentially aligned with one of the plurality of stator teeth.

13. The stator according to claim 12, wherein the flange comprises a housing or housing component.

14. The stator according to claim 12, wherein there are a plurality of the at least one of the recess, groove, or indentation that are in interlocking engagement with an oppositely arranged plurality of the at least one the ridge, elevation, or rib of the flange.

15. The stator according to claim 14, wherein the plurality of the at least one of the grooves, indentations, or recesses extend in a longitudinal extension thereof in a radial direction.

16. The stator according to claim 12, wherein the at least one of the groove, indentation, or recess includes a channel or trough covered in an unfilled manner by the at least one of the ridge, elevation, or rib to allow for a cooling and hydraulic fluid line.

17. The stator according to claim 12, wherein the at least one of the groove, indentation, or recess is stepped.

18. The stator according to claim 12, wherein the at least one of the groove, indentation, or recess has a wall facing inwardly which acts as a stop for a counter stop provided by the at least one of the ridge, elevation, or rib.

19. The stator according to claim 12, further comprising an adhesive gap between the rear side of the laminated stator core and the front side of the flange that is filled with adhesive.

* * * * *